United States Patent
Robert

(10) Patent No.: US 9,568,494 B2
(45) Date of Patent: Feb. 14, 2017

(54) DEVICE AND METHOD FOR CHECKING A PROBE FOR MEASURING THE PRESSURE OF A FLOW

(71) Applicant: THALES, Neuilly-sur-Seine (FR)

(72) Inventor: François Robert, Chanceaux sur Choisille (FR)

(73) Assignee: Thales, Courbevoie (FR)

( * ) Notice: Subject to any disclaimer, the term of this patent is extended or adjusted under 35 U.S.C. 154(b) by 47 days.

(21) Appl. No.: 14/555,903

(22) Filed: Nov. 28, 2014

(65) Prior Publication Data
US 2015/0153382 A1   Jun. 4, 2015

(30) Foreign Application Priority Data

Nov. 29, 2013   (FR) ...................................... 13 02783

(51) Int. Cl.
| | |
|---|---|
| G01P 21/00 | (2006.01) |
| G01P 21/02 | (2006.01) |
| G01L 27/00 | (2006.01) |
| G01P 5/14 | (2006.01) |
| G01P 5/16 | (2006.01) |

(52) U.S. Cl.
CPC ............. G01P 21/025 (2013.01); G01L 27/00 (2013.01); G01P 5/14 (2013.01); G01P 5/16 (2013.01)

(58) Field of Classification Search
USPC ................................................. 73/1.82, 1.57
See application file for complete search history.

(56) References Cited

U.S. PATENT DOCUMENTS

| | | | | |
|---|---|---|---|---|
| 4,102,205 | A | * | 7/1978 | Pies ....................... G01N 29/30 702/39 |
| 5,257,536 | A |  | 11/1993 | Beigbeder et al. |
| 5,524,627 | A | * | 6/1996 | Passi ...................... B82Y 15/00 600/445 |
| 2006/0123922 | A1 |  | 6/2006 | Froehlich et al. |
| 2006/0155515 | A1 |  | 7/2006 | Buhl et al. |
| 2008/0027660 | A1 |  | 1/2008 | Keese et al. |
| 2012/0118037 | A1 |  | 5/2012 | Leblond et al. |

FOREIGN PATENT DOCUMENTS

| | | |
|---|---|---|
| DE | 102004031637 A1 | 1/2006 |
| FR | 2665539 A1 | 2/1992 |
| FR | 2959822 A1 | 11/2011 |

* cited by examiner

*Primary Examiner* — Helen Kwok
*Assistant Examiner* — Nashmiya Fayyaz
(74) *Attorney, Agent, or Firm* — Baker & Hostetler LLP

(57) ABSTRACT

A device is provided for checking a probe for measuring the pressure of a flow, the probe comprising an internal volume and at least one orifice communicating with the outside of the volume. The device comprises: an acoustic transmitter and an acoustic receiver; connection means to connect the device to the probe, such that the transmitter transmits an acoustic signal propagated in the internal volume, and such that the receiver picks up an acoustic signal observed in the internal volume; processing means suitable for comparing the observed signal to a reference signal. The connection means are configured in such a way that an incorrect connection of the probe disturbs the propagation in the internal volume of an acoustic signal transmitted by the transmitter. The processing means are configured to detect an incorrect connection of the probe by comparing the acoustic signal observed in the internal volume with the reference signal.

10 Claims, 3 Drawing Sheets

DEVICE AND METHOD FOR CHECKING A PROBE FOR MEASURING THE PRESSURE OF A FLOW

CROSS-REFERENCE TO RELATED APPLICATION

This application claims priority to foreign French patent application No. FR 1302783, filed on Nov. 29, 2013, the disclosure of which is incorporated by reference in its entirety.

FIELD OF THE INVENTION

The invention relates to a device for checking a probe for measuring the pressure of a flow. The invention is of particular use in the field of the pressure probes implemented in the aeronautical field.

BACKGROUND

In effect, piloting any aircraft entails knowing its relative speed in relation to the air, that is to say to the relative wind. This speed is determined using static pressure Ps and total pressure Pt measurement probes. The total Pt and static Ps pressures provide the modulus of this speed vector.

As is known, the total pressure Pt can be measured using a so-called Pitot tube. This is a tube that is open at one of its ends and blocked at the other. The open end of the tube substantially faces into the flow. The stream of air situated upstream of the tube is progressively slowed down until it reaches an almost zero speed at the tube inlet. The slowing down of the speed of this stream of air increases its pressure. This increased pressure forms the total pressure Pt of the flow of air. The principle of such a total pressure measurement probe is recalled in FIG. 1. The probe 10 is intended to be fixed through an opening 11 produced in the skin 12 of an aircraft. The probe 10 comprises a part 13 that is external to the skin 12 and formed by a Pitot tube 14 borne by a strut 15. The probe 10 also comprises an internal part 16 essentially comprising an electrical connector 17 and a pneumatic connector 18. The connector 17 makes it possible to electrically connect the probe 10 to the aircraft, for example to connect heating means for the deicing of the probe 10. The connector 18 allows for the pneumatic connection of the Pitot tube 14 to a pressure sensor or other measurement device, situated inside the skin 12 of the aircraft. The probe 10 is positioned on the skin 12 of the aircraft such that the Pitot tube 14 is oriented substantially on a longitudinal axis of the aircraft, excluding laminar boundary layer, for the direction of the flow, embodied by an arrow 19, to substantially face an inlet orifice 20 situated at a first end 21 of the Pitot tube 14. In the example represented, the Pitot tube 14 is fixed relative to the skin 12 of the aircraft. It is of course possible to mount the Pitot tube 14 on a moving strut such as, for example, a paddle that can be oriented in the axis of the flow as is, for example, described in the patent published under the number FR 2 665 539.

In practice, the flow of air can convey solid or liquid particles, such as, for example, the water from the clouds, that are likely to penetrate into the Pitot tube and build up in the tube at the blocked end. To prevent such a build-up from disturbing the pressure measurement, one or more drain holes and water traps are generally provided, to avoid any risk of obstruction of the ducts responsible for transmitting the total pressure to the pressure sensors situated inside the skin of the aircraft or to the instruments of the aircraft instrument panel. As represented in FIG. 2, the Pitot tube 14 thus comprises, in proximity to an end 22, a drain hole 23 that makes it possible to discharge particles likely to penetrate inside the tube 14. Still at the end 22 of the tube, an air line 24 opens into the tube 14 to form therein a pressure tap 40 at which the air pressure is to be measured. The pressure tap 40 is generally constructed in such a way as to avoid the ingestion of water into the tube 14 and thus form a water trap. The line 24 is, for example, linked to a pressure sensor not represented in FIG. 2. The pressure sensor makes it possible to effectively measure the pressure of the air prevailing inside the tube 14 at its end 22. Apart from the drain hole or holes 23, the sections of which are small compared to that of the tube 14, the tube 14 is closed at its end 22. The pressure measured at this end therefore represents the total pressure Pt of the flow of air.

The drain holes make it possible to discharge the liquids and any particles that may penetrate into the tube. The slowing down of the air in the tube is therefore not complete and the total pressure Pt measurement is affected. More specifically, the greater the efforts that are made to avoid the build-up of water or of particles of significant size, the more the total pressure measurement is affected by increasing the dimensions or the number of drain holes. Conversely, the greater the efforts to improve the total pressure Pt measurement by reducing the dimensions or the number of drain holes, the greater the risk of build-up of water or of particles. With a Pitot tube, there therefore has to be a trade-off between quality of the total pressure Pt measurement and risk of disturbance of the measurement because of the penetration of water, or of particles conveyed by the flow of air where the measurement is performed.

In the operational life of aircraft, the drain holes can be polluted, because of the ingestion of dust, insects, plant residues or other foreign bodies. Because of their size and the position of the Pitot tubes on the fuselage of an aircraft, the periodic checking of the integrity of the drain holes is difficult.

The checking of the drain holes of the Pitot tubes is generally done visually. The operator responsible for maintaining the aeroplanes inspects the drain hole or holes using a small lamp. If foreign bodies are observed, the probe is dismantled, and its pneumatic circuits cleaned. This operation is all the more difficult when the aeroplane is of large size. Access to the probe and to the drain holes whose diameter is generally less than 1 mm is difficult.

Also known from the applicant is a checking device intended to be temporarily connected to the pressure measurement probe, and that makes it possible to check, using an acoustic transmitter and an acoustic receiver, the non-blocking of the internal cavities and the drain holes of the probe. The principle of such a device is notably described by the patent published under the reference FR 2 959 822. It is also recalled by FIG. 2 of this application. The checking device 25 comprises a transmitter 26 and a receiver 27 intended to be connected to an internal volume 30 of the probe, formed by the inside of the tube 14, the drain hole or holes 23 and the line 24. The transmitter transmits an acoustic signal that is propagated in the internal volume 30 and the receiver is configured to pick up an acoustic signal observed in the internal volume 30. The device also comprises processing means 28 that make it possible to compare the acoustic signal observed in the internal volume to a reference acoustic signal measured on a probe that is not clogged, in order to establish the presence of particles in the internal volume.

The principle of the device is therefore based on a characterization of the architecture of the internal volume, by means of a measurement of the internal acoustics of the probe. The detection of pollution or of clogging of the drain holes is based on the comparison of this measurement with a reference signal measured on a non-clogged probe. It will be understood that an incorrect connection of the probe alters the internal acoustics measured by the device. The comparison of an acoustic signal measured for a probe incorrectly connected to the device, to the reference signal, can thus incorrectly conclude that the drain holes of a probe are clogged. To ensure an effective check, the connection of the device with the probe has to be reproducible. It is also desirable to have means that make it possible to check the reliability of the connection with the probe.

SUMMARY OF THE INVENTION

To this end, the subject of the invention is a device for checking a probe for measuring the pressure of a flow; the probe comprising an internal volume and at least one orifice communicating with the outside of the volume. The device comprises:
  an acoustic transmitter and an acoustic receiver,
  connection means intended to connect the device to the probe, in such a way that the transmitter transmits an acoustic signal that is propagated in the internal volume and in such a way that the receiver picks up an acoustic signal observed in the internal volume,
  processing means suitable for comparing the observed signal to a reference signal.

In the device according to the invention, the connection means are configured in such a way that an incorrect connection of the probe disturbs the propagation in the internal volume of an acoustic signal transmitted by the transmitter. The processing means are configured to detect an incorrect connection of the probe by comparing the acoustic signal observed in the internal volume with the reference signal.

Advantageously, the connection means are configured to generate, in the case of an incorrect connection with the probe, a characteristic disturbance of the acoustic signal observed in the internal volume.

Advantageously, the connection means comprise a sleeve open at a first end and comprise an abutment intended to come into contact with the probe when correctly connected to the device. The sleeve comprises at least one detection hole passing through the sleeve positioned in proximity to the abutment, intended to be blocked by the probe when correctly connected to the device; the at least one detection hole not being blocked in the case of an incorrect connection with the probe so as to disturb the propagation in the internal volume of an acoustic signal transmitted by the transmitter.

Advantageously, the acoustic signal transmitted sweeps a given frequency band and the acoustic signal picked up is compared over the frequency band to a reference spectrum. An incorrect connection with the probe being detected by the processing means, by comparing the observed signal with the reference signal over a predefined frequency range in the frequency band.

Advantageously, the device comprises information means activated when an incorrect connection with the probe is detected.

Advantageously, the device is intended to check a total pressure, static pressure, Pitot/static probe or a probe of totally or partially pneumatic incidence.

Advantageously, the connection means further comprise guiding and holding means, intended to facilitate the insertion of the probe into the sleeve and to hold the device in position on the probe.

Advantageously, the device is intended to check a probe comprising a tubular portion of which an open end constitutes an inlet orifice for a stream of air of the flow into the probe. In this case, the sleeve of substantially tubular form is intended to grip the tubular portion of the probe.

Advantageously, the device comprises a plurality of detection holes of substantially tubular form extending radially and distributed angularly in a uniform manner around the sleeve.

Advantageously, the guiding and holding means comprise a set of spacers and joints.

The invention relates also to a method for detecting an incorrect connection between a probe for measuring the pressure of a flow and a device according to the invention and comprising steps consisting in:
  connecting the probe to the device using connection means,
  transmitting an acoustic signal by means of the transmitter,
  picking up an acoustic signal by means of the receiver,
  detecting an incorrect connection of the probe by comparing the acoustic signal picked up with the reference acoustic signal.

BRIEF DESCRIPTION OF THE DRAWINGS

The invention will be better understood and other advantages will become apparent on reading the detailed description of the embodiments given by way of example in the following figures.

In the interest of clarity, the same elements bear the same references in the different figures.

DETAILED DESCRIPTION

Figure 1:
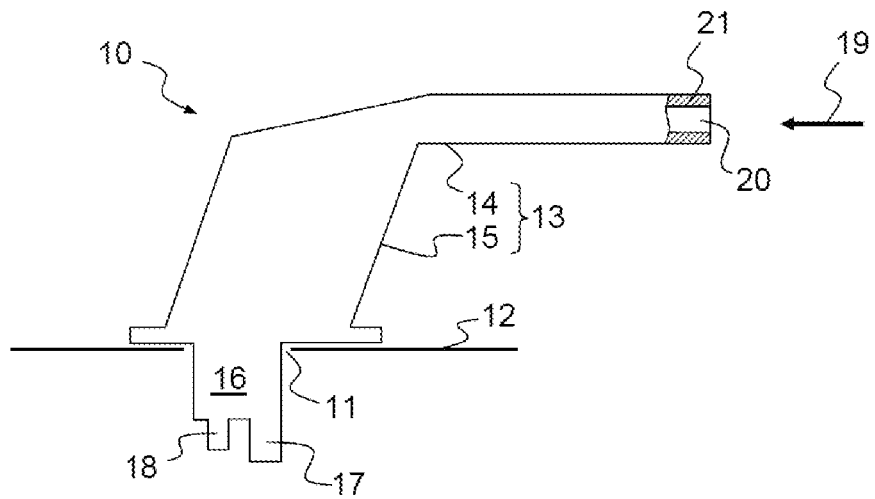
FIG. 1, already presented, represents a total pressure measurement probe according to the known prior art, FIG. 2, already presented, represents a partial view of the probe of FIG. 1 in the vicinity of which is arranged a checking device according to the known prior art.
Figure 3A:
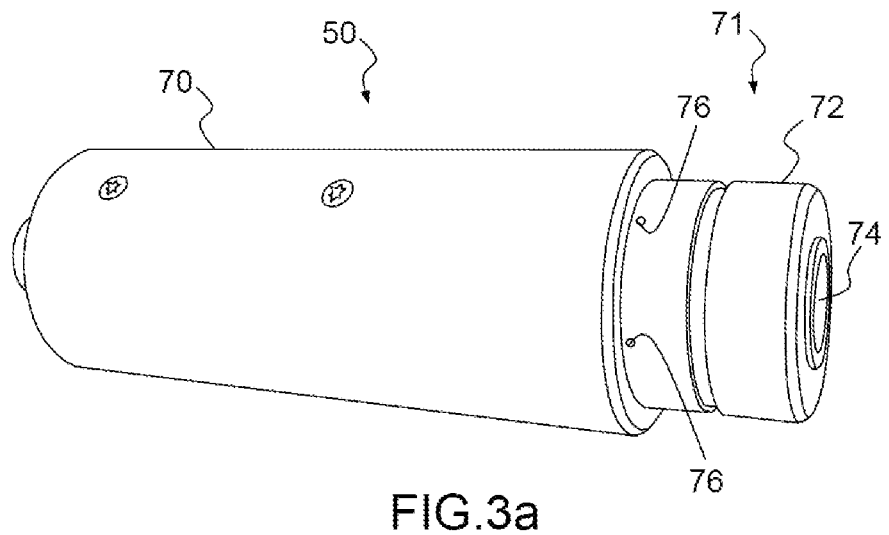
FIGS. 3a and 3b represent, by two perspective views, an example of a device for checking a pressure measurement probe.
Figure 3B:
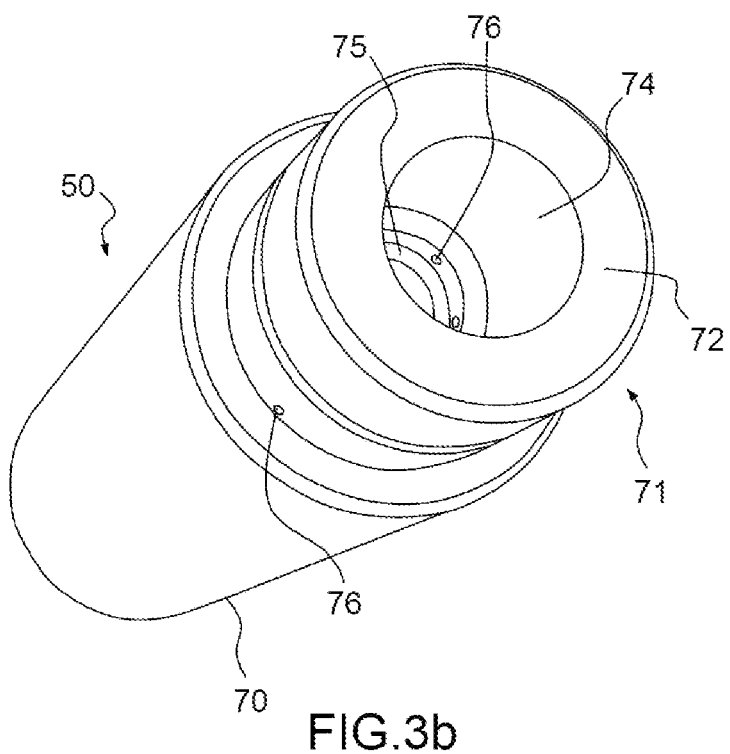

FIGS. 3a and 3b represent, by two perspective views, an example of a checking device according to the invention. The checking device 50 is intended to be temporarily connected to a pressure measurement probe, during an aircraft maintenance operation. The invention is described in relation to a total pressure measurement probe, similar to that described previously by FIG. 1. It is of course possible to implement it for a static pressure measurement probe, for a Pitot/static probe or for a probe of totally or partially pneumatic incidence. Generally, the device according to the invention is intended for the checking of a probe comprising an internal volume and at least one orifice communicating with the outside of the volume. In the case of the total pressure probe previously described, the internal volume 30 of the probe comprises the inside of the Pitot tube 14, the drain hole or holes 23 and the line 24 for example linked to a pressure sensor. In a widely-used architecture, the probe comprises two drain holes formed facing one another in the Pitot tube.

Figure 2:
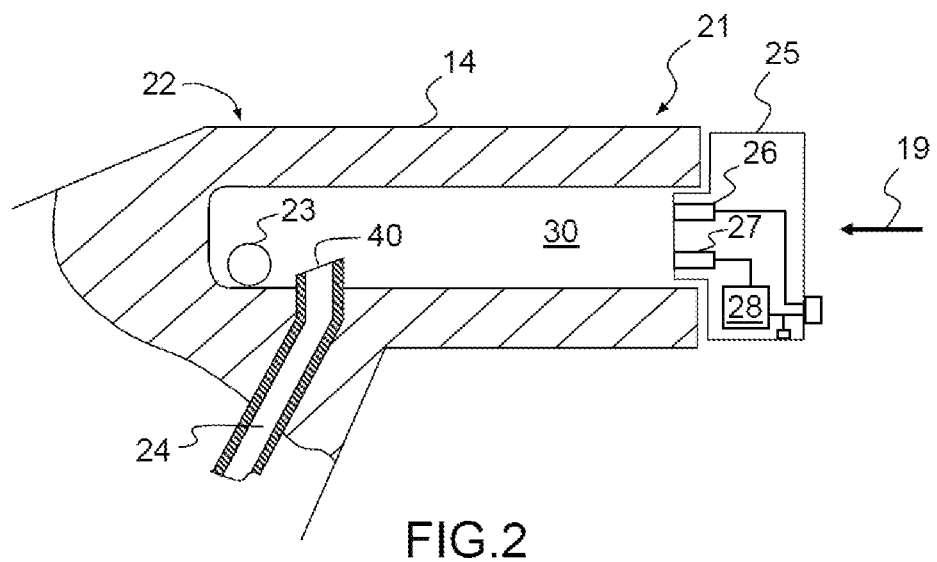

The principle of detecting a clogging of the probe comprises elements common to those of the device described in the preamble by means of FIG. 2. The checking device 50 comprises in particular:

an acoustic transmitter 26 and an acoustic receiver 27,
connection means intended to connect the device to the probe, in such a way that the transmitter 26 transmits an acoustic signal that is propagated in the internal volume 30 and in such a way that the receiver 27 picks up an acoustic signal observed in the internal volume 30,
processing means 28 suitable for comparing the observed acoustic signal to a reference acoustic signal.

The checking device according to the invention comprises connection means 71 that are notably designed to make it possible to detect an incorrect connection of the device to the probe. These connection means will be described in detail hereinbelow. It has to be stated at this point that the transmitter 26 and the receiver 27, as well as the processing means 28, are not visible in FIGS. 3a and 3b; these components being concealed in the two views by the connection means 71. The principle of their operation and of their incorporation in the checking device is similar to that of FIG. 2.

As represented in FIGS. 3a and 3b, the checking device 50 comprises a body 70 and connection means 71 intended to connect the device temporarily to the pressure measurement probe to be checked. The connection means 71 comprise a sleeve 72 linked by a first end to the body 70 and in the extension thereof. The sleeve 72 comprises, at a second end, an opening 74 configured in such a way that the nose of the probe can be inserted into the sleeve through the opening 74. The connection means 71 also comprise an abutment 75, in proximity to the first end of the sleeve, intended to be in contact with the nose of the probe. The nose of the probe corresponds, for example, to the end 21 of the Pitot tube 14. In the exemplary embodiment represented, the sleeve is of substantially tubular form, so as to grip the Pitot tube over a portion of its length. In other words, the device can be intended to check a probe comprising a tubular portion of which an open end 21 forms an inlet orifice for a stream of air of the flow into the probe. The sleeve of substantially tubular form is intended to grip the tubular portion of the probe. When the probe is correctly connected to the device, its end 21, of annular form, comes into contact with the annular abutment 75.

The connection means 71 also comprise at least one detection hole 76 passing through the sleeve. The detection hole 76 is formed in the sleeve in proximity to the abutment 75, so as to be blocked by the probe when the latter is in contact with the abutment 75. In the exemplary embodiment represented, the connection means comprise six detection holes, of substantially tubular form, extending radially between the inside and the outside of the sleeve, and distributed angularly in a uniform manner.

Thus, when the probe is correctly connected to the device, the detection hole or holes 76 are blocked by the side walls of the tube 14. The acoustic transmitter and receiver, which are incorporated in the body of the device in proximity to the abutment 75, respectively make it possible to transmit an acoustic signal that is propagated in the internal volume 30 and to pick up an acoustic signal observed in the internal volume 30. The measured acoustic signal is characteristic of the internal volume of the probe. Its comparison to a reference signal makes it possible to detect any alteration of the internal architecture of the probe, for example by clogging of the drain holes 23.

On the other hand, when the probe is incorrectly connected to the device, that is to say when it is not in contact with the abutment 75, the detection hole or holes 76 allow communication between the inside and the outside of the sleeve. The acoustic signal transmitted by the transmitter 26 is propagated in the internal volume of the probe but also in the detection holes 76 communicating with the outside of the sleeve. The measured acoustic signal is therefore no longer only the bearer of information concerning the internal architecture of the probe. The measured acoustic signal bears also the acoustic signature of the detection hole or holes 76 passing through the sleeve. In the example represented in FIGS. 3a and 3b, the idea is therefore to form one or more detection holes in the sleeve, in proximity to the abutment 75, so as to generate, in the case of an incorrect connection with the probe, a disturbance characteristic of the measured acoustic signal. This characteristic disturbance can then be identified by comparison of the measured acoustic signal to a reference signal to detect an incorrect connection, by the processing means 28 of the device.

Figure 4:
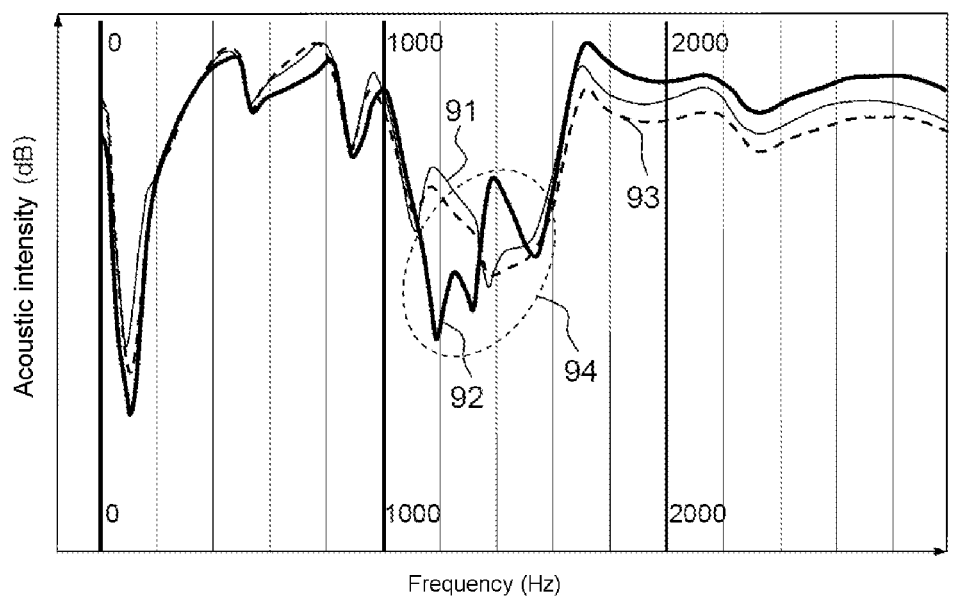
FIG. 4 illustrates the benefit of the checking device for the detection of an incorrect connection with the probe.

FIG. 4 illustrates the benefit of the checking device for the detection of an incorrect connection with the probe. As was indicated in the preamble to this application, the principle of the detection of a clogging of the drain holes by the device is based on the comparison of this measurement with a reference signal measured on a non-clogged probe. For this, the acoustic signal transmitted by the transmitter can be the acoustic signal obtained by sweeping a given frequency band, also known by the term chirp. The acoustic signal observed by the receiver is compared over the frequency band to a reference spectrum. The frequency band can cover extended acoustic frequencies suited to the type of probe and more generally to the complete pneumatic circuit.

FIG. 4 shows acoustic signals measured by the device. The intensity of the measured acoustic signal is represented as a function of the frequency. The transmitted acoustic signal is obtained by sweeping an increasing frequency band between 0 and 3000 Hz. The signal referenced 91 is an acoustic signal measured in the case of a probe that is not clogged and is correctly connected to the device, that is to say in contact with the abutment 75. The signal 91 corresponds to a reference signal for the processing means 28. The signal referenced 92 is an acoustic signal measured with the same probe that is not clogged, but is this time incorrectly connected to the device, its end not being in contact with the abutment. The detection holes 76 are not blocked by the probe, such that the transmitted acoustic signal is propagated both in the internal volume of the probe and through the detection holes 76. This alteration of the internal acoustics implies a characteristic disturbance 94 of the acoustic signal observed in the internal volume. This characteristic disturbance is particularly visible in the frequency range between 1200 and 1600 Hz. In this frequency range, a significant deviation is observed between the measured acoustic signal 92 for an incorrectly connected probe, and the reference signal 91 of a correctly connected probe.

Advantageously, the processing means 28 can be configured in such a way as to identify this characteristic disturbance 94, by comparing the signals 91 and 92 over a predefined frequency range, for example between 1200 and 1600 Hz.

FIG. 4 also shows a signal referenced 93 corresponding to a signal measured for the same probe that is not clogged, and for an incorrectly connected probe, in the same way as for the signal 92, but this time in the case of a device whose sleeve does not include any detection hole. This signal 93 makes it possible to illustrate the benefit of the detection hole or holes configured in such a way as to generate a characteristic disturbance, easily identifiable by processing of the signal. In effect, although the signal 93 is not strictly identical to the reference signal 91, particularly in the 1200-1600 Hz frequency range, it is observed that the signal deviations are not significant. The detection of an incorrect connection is therefore difficult, the risk of an incorrect diagnosis is high. Deviations resulting for example from a difference in ambient temperature at the time of the test, or even from a clogging of the probe, can be interpreted incorrectly as an incorrect connection. The configuration of the connection means comprising one or more detection holes advantageously makes it possible to generate a characteristic disturbance of the measured acoustic signal which is clearly distinguished from the reference signal. The processing means are then configured to identify, in the measured acoustic signal, the signature of this characteristic disturbance.

Advantageously, the checking device 50 also comprises information means, activated when a deviation between the measured acoustic signal and the reference signal exceeds a predefined threshold in a predefined frequency range, or, in other words, when an incorrect connection is detected by identification of the characteristic disturbance 94 by the processing means. The information means can be formed by a lamp that an operator can observe during a checking operation. The information means can also be formed by means of an audible warning device.

Figure 5:
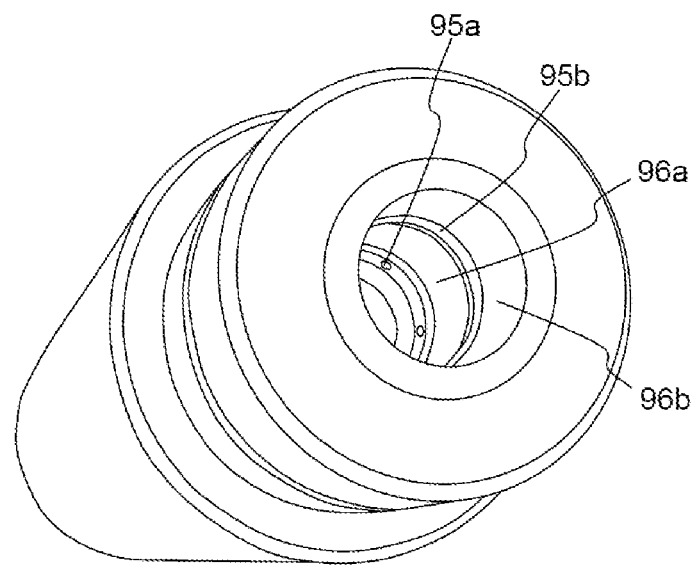
FIG. 5 represents an example of a checking device provided with guiding and holding means.

FIG. 5 represents a checking device provided with guiding and holding means. It has been indicated that the checking device is intended to be connected to the probe temporarily during a maintenance operation. To facilitate this maintenance operation by an operator, the device can advantageously comprise guiding means for the insertion of the tubular portion of the probe into the sleeve of the device, and holding means that make it possible to ensure that the device connected to the probe remains in position. In the example embodiment represented in FIG. 5, the guiding and holding means comprise a set of joints and spacers. Advantageously, the guiding and holding means comprise two spacers 96*a* and 96*b*, inserted between two joints 95*a* and 95*b*.

A first example of a checking device in which the connection means make it possible to detect an incorrect connection by obstruction, by the probe, of detection holes formed in the connection means, has been represented and described through FIGS. 3*a*, 3*b* and 5. It is clear that this example is not limiting on the present invention. Other variants can also be envisaged, for example implementing a switchover device that opens or closes a cavity of the device when the probe is correctly connected. Thus, the present invention generally covers a device comprising connection means configured in such a way that an incorrect connection of the probe disturbs the propagation in the internal volume of an acoustic signal transmitted by the transmitter, or, in other words, in such a way as to generate, in the case of an incorrect connection, a characteristic disturbance of the acoustic signal observed in the internal volume of the probe. Furthermore, processing means of the device are configured to detect an incorrect connection of the probe by comparing the acoustic signal observed in the internal volume with the reference signal.

This configuration of the connection means makes it possible to detect an incorrect connection simply and inexpensively, by passive connection means and appropriate signal processing. This solution also offers the benefit of limiting any overpressure, potentially destructive for the microphone, which could be caused by an operator placing a finger over the opening, resulting in a local increase in the pressure on the transmitter and the receiver. This configuration is above all particularly advantageous by comparison with alternative solutions implementing an electromechanical connection interface between the probe and the device.

The invention relates also to an assembly comprising a pressure measurement probe and a checking device that has the features described previously.

The invention relates finally to a method for detecting an incorrect connection of a checking device to a pressure measurement probe. The method according to the invention comprises in particular steps consisting in:
connecting the probe to the device using connection means,
transmitting an acoustic signal by means of the transmitter,
picking up an acoustic signal by means of the receiver,
detecting an incorrect connection by comparing the observed signal with the reference signal.

The invention claimed is:

1. A device for checking a probe for measuring the pressure of a flow; the probe comprising an internal volume and at least one orifice communicating with the outside of the volume; the device comprising:
an acoustic transmitter and an acoustic receiver,
connection means intended to connect the device to the probe, in such a way that the transmitter transmits an acoustic signal that is propagated in the internal volume and in such a way that the receiver picks up an acoustic signal observed in the internal volume, and
processing means suitable for comparing the observed signal to a reference signal;
the connection means being configured in such a way that an incorrect connection of the probe disturbs the propagation in the internal volume of an acoustic signal transmitted by the transmitter, and
the processing means being configured to detect an incorrect connection of the probe by comparing the acoustic signal observed in the internal volume with the reference signal;
wherein the connection means comprise a sleeve open at a first end and comprise an abutment intended to come into contact with the probe when correctly connected to the device; and wherein the sleeve comprises at least one detection hole passing through the sleeve positioned in proximity to the abutment, intended to be blocked by the probe when correctly connected to the device; the at least one detection hole not being blocked in the case of an incorrect connection with the probe so as to disturb the propagation in the internal volume of an acoustic signal transmitted by the transmitter.

2. The device according to claim 1, wherein the connection means are configured to generate, in the case of an incorrect connection with the probe, a characteristic disturbance of the acoustic signal observed in the internal volume.

3. The device according to claim 1, wherein the acoustic signal transmitted sweeps a given frequency band and in which the acoustic signal picked up is compared over the frequency band to a reference spectrum; an incorrect connection with the probe being detected by the processing means, by comparing the observed signal with the reference signal over a predefined frequency range in the frequency band.

4. The device according to claim 1, further comprising information means activated when an incorrect connection with the probe is detected.

5. The device according to claim 1, being intended to check a total pressure, static pressure, Pitot/static probe or a probe of totally or partially pneumatic incidence.

6. The device according to claim 1, wherein the connection means further comprise guiding and holding means, intended to facilitate the insertion of the probe into the sleeve and to hold the device in position on the probe.

7. The device according to claim 1, being intended to check a probe comprising a tubular portion of which an open end constitutes an inlet orifice for a stream of air of the flow into the probe, the sleeve of substantially tubular form being intended to grip the tubular portion of the probe.

8. The device according to claim 7, further comprising a plurality of detection holes of substantially tubular form extending radially and distributed angularly in a uniform manner around the sleeve.

9. The device according to claim 6, wherein the guiding and holding means comprise a set of spacers and of joints.

10. A method for detecting an incorrect connection between a probe for measuring the pressure of a flow and a device according to claim 1, comprising:
 connecting the probe to the device using connection means,
 transmitting an acoustic signal by means of the transmitter,
 picking up an acoustic signal by means of the receiver, and
 detecting an incorrect connection of the probe by comparing the acoustic signal picked up with the reference acoustic signal.

* * * * *